(12) United States Patent
Chiu et al.

(10) Patent No.: US 10,912,710 B2
(45) Date of Patent: Feb. 9, 2021

(54) MICROBUBBLE DEVICE CONTROLLER AND SYSTEM WITH THE MICROBUBBLE DEVICE CONTROLLER

(71) Applicant: CASHIDO CORPORATION, Miaoli County (TW)

(72) Inventors: Chun-Lung Chiu, Miaoli County (TW); Chih-Hsiang Chen, Miaoli County (TW)

(73) Assignee: Cashido Corporation, Toufen (TW)

( * ) Notice: Subject to any disclaimer, the term of this patent is extended or adjusted under 35 U.S.C. 154(b) by 66 days.

(21) Appl. No.: 16/450,516

(22) Filed: Jun. 24, 2019

(65) Prior Publication Data

US 2020/0397654 A1 Dec. 24, 2020

(51) Int. Cl.
*B01F 3/04* (2006.01)
*A61H 33/02* (2006.01)
*A47K 3/10* (2006.01)
*F16K 31/06* (2006.01)
*B01F 15/00* (2006.01)

(52) U.S. Cl.
CPC ............ *A61H 33/02* (2013.01); *A47K 3/10* (2013.01); *B01F 3/0446* (2013.01); *B01F 3/0451* (2013.01); *B01F 3/04503* (2013.01); *B01F 15/00162* (2013.01); *B01F 15/00305* (2013.01); *B01F 15/00422* (2013.01); *F16K 31/06* (2013.01); *A61H 2033/022* (2013.01); *A61H 2201/5071* (2013.01); *A61H 2201/5097* (2013.01); *B01F 2003/04872* (2013.01)

(58) Field of Classification Search
CPC .................. B01F 3/0451; B01F 3/0446; B01F 15/00162; A61H 33/02
See application file for complete search history.

(56) References Cited

U.S. PATENT DOCUMENTS

2017/0120202 A1* 5/2017 Schmidt .................. B01F 5/106

* cited by examiner

*Primary Examiner* — Robert A Hopkins
(74) *Attorney, Agent, or Firm* — Wang Law Firm, Inc.

(57) ABSTRACT

A microbubble device controller includes a box, and a first water pipe, a gas pipe and a bypass pipe installed in the box. The first water pipe is connected to a pump and has a first electromagnetic control valve to open or close the first water pipe. The gas pipe is connected to a gas source and the pump, and has a second electromagnetic control valve to open or close the gas pipe. The bypass pipe is connected to the first water pipe and has a pressure switch in telecommunication connection with the second electromagnetic control valve. The first electromagnetic control valve controls the first water pipe to be in the high flow state or a closed state to affect the bypass pipe. When the bypass pipe is in a high pressure state, the second electromagnetic control valve opens the gas pipe, or closes the gas pipe otherwise.

12 Claims, 4 Drawing Sheets

MICROBUBBLE DEVICE CONTROLLER AND SYSTEM WITH THE MICROBUBBLE DEVICE CONTROLLER

BACKGROUND

Field of the Invention

The present invention relates to a controller, and more particularly to a microbubble device controller. The present invention further relates to a system with the microbubble device controller.

Related Prior Art

The general micro-bubble equipment needs to be equipped with additional controllers and pipelines to effectively control the normal operation of the micro-bubble equipment. Some of the accessories of the conventional controllers are mounted on the pump, which will lead to assembly troubles, increased costs, complicated wiring, etc. Therefore, there is a need for a bubble device controller that can be assembled quickly with the pump.

The present invention has arisen to mitigate and/or obviate the afore-described disadvantages.

SUMMARY

One objective of the present invention is to provide a microbubble device controller which is capable of reducing the difficulty of assembly and the complexity of wiring, thereby reducing the cost.

To achieve the above objective, the microbubble device controller comprises:

a box having an accommodation space;

a first water pipe disposed in the accommodation space, and having one end connected to a pump, wherein the first water pipe is provided with a first electromagnetic control valve to control the first water pipe to be in a high flow rate state or a closed state;

a gas pipe disposed in the accommodation space and having one end connected to a gas supply source and another end connected to the pump, wherein the gas pipe is provided with a second electromagnetic control valve for controlling the gas pipe to be in an opened state or a closed state;

a bypass pipe having one end connected to the first water pipe and another end connected to a microbubble pressure reducing valve; wherein the bypass pipe has a high pressure state and a low pressure state, when the first water pipe is in the high flow rate state, the bypass pipe is in the low pressure state, when the first water pipe is in the closed state, the bypass pipe is in the high pressure state, the bypass pipe is provided with a pressure switch for detecting whether the bypass pipe is in the high pressure state or the low pressure state, the pressure switch is in telecommunication connection with the second electromagnetic control valve, when the bypass pipe is in a high pressure state, the second electromagnetic control valve opens the gas pipe, when the bypass pipe is in a low pressure state, the second electromagnetic control valve closes the gas pipe.

The present invention further provides a microbubble device controller, which comprises:

a box having an accommodation space;

a second water pipe disposed in the accommodation space, and having one end connected to a pump and another end connected to a microbubble pressure reducing valve, wherein the second water pipe has a high pressure state and a closed state, and is provided with a pressure switch for detecting whether the second water pipe is in the high pressure state or the closed state;

a gas pipe disposed in the accommodation space, and having one end connected to a gas supply source and another end connected to the pump, wherein the gas pipe is provided with a second electromagnetic control valve for controlling the gas pipe to be in an opened state or a closed state, the pressure switch is in telecommunication connection with the second electromagnetic control valve, when the second water pipe is in the high pressure state, the second electromagnetic control valve opens the gas pipe, and when the second water pipe is in the closed state, the second electromagnetic control valve closes the gas pipe.

It can be seen from the foregoing that the first water pipe, the gas pipe, the bypass pipe, the first electromagnetic control valve, the second electromagnetic control valve, and the pressure switch are all disposed in the box. Through the cooperation of the above-mentioned pipes and the controller, a complete function is realized, so that when the product is installed, the microbubble device controller can be easily assembled with the peripheral equipment and the pump to reduce the assembly troubles and solve complicated wiring problems.

The present invention further provides a system with the microbubble device controller, which comprises:

a tank having a water-receiving space;

a pump connected to a return pipe, the first water pipe and the gas pipe, wherein the return pipe is connected to the water-receiving space;

a start switch in telecommunication connection with the pump to turn on or turn off the pump;

a function switch in telecommunication connection with the first electromagnetic control valve to control the first water pipe to be in a high flow rate or a closed state;

a spa tube in communication with the first water pipe to provide a spa function; and a microbubble pressure reducing valve connected to the bypass pipe to provide a microbubble function.

The present invention further provides a system with the microbubble device controller, which comprises:

a tank has a water-receiving space;

a pump connected to a return pipe, the second water pipe and the gas pipe, wherein the return pipe is connected to the water-receiving space;

a start switch in telecommunication connection with the pump to turn on or turn off the pump; and a microbubble pressure reducing valve connected to the second water pipe to provide a microbubble function.

It can be seen from the foregoing that the second water pipe, the gas pipe, the second electromagnetic control valve, and the pressure switch are all disposed in the box. Through the cooperation of the above-mentioned pipes and the controller, a complete function is realized, so that when the product is installed, the microbubble device controller can be easily assembled with the peripheral equipment and the pump to reduce the assembly troubles and solve complicated wiring problems.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

DETAILED DESCRIPTION

The present invention will be clearer from the following description when viewed together with the accompanying drawings, which show, for purpose of illustrations only, the preferred embodiment in accordance with the present invention.

Figure 1:
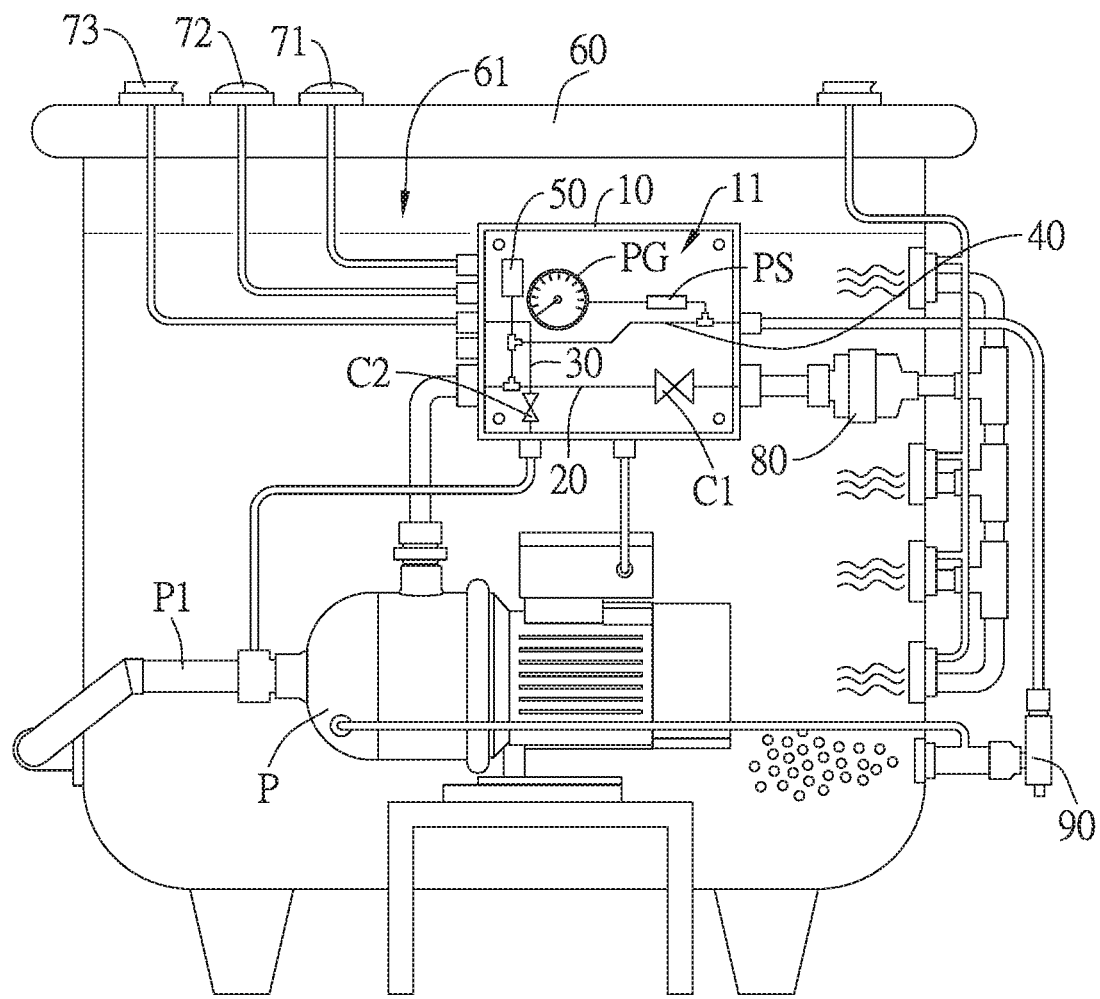
FIG. 1 is a schematic view of a first embodiment of a system equipped with a microbubble device controller of the present invention.
Figure 2:
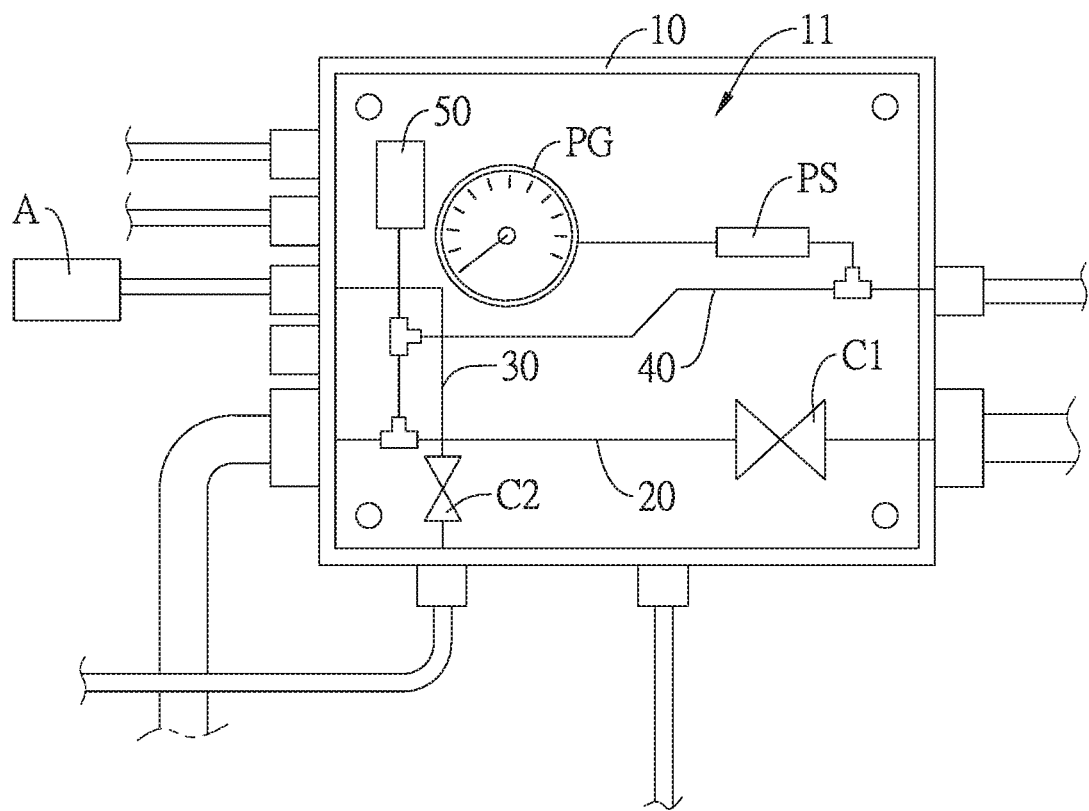
FIG. 2 is a schematic view of the first embodiment of the microbubble device controller of the present invention.
Figure 3:
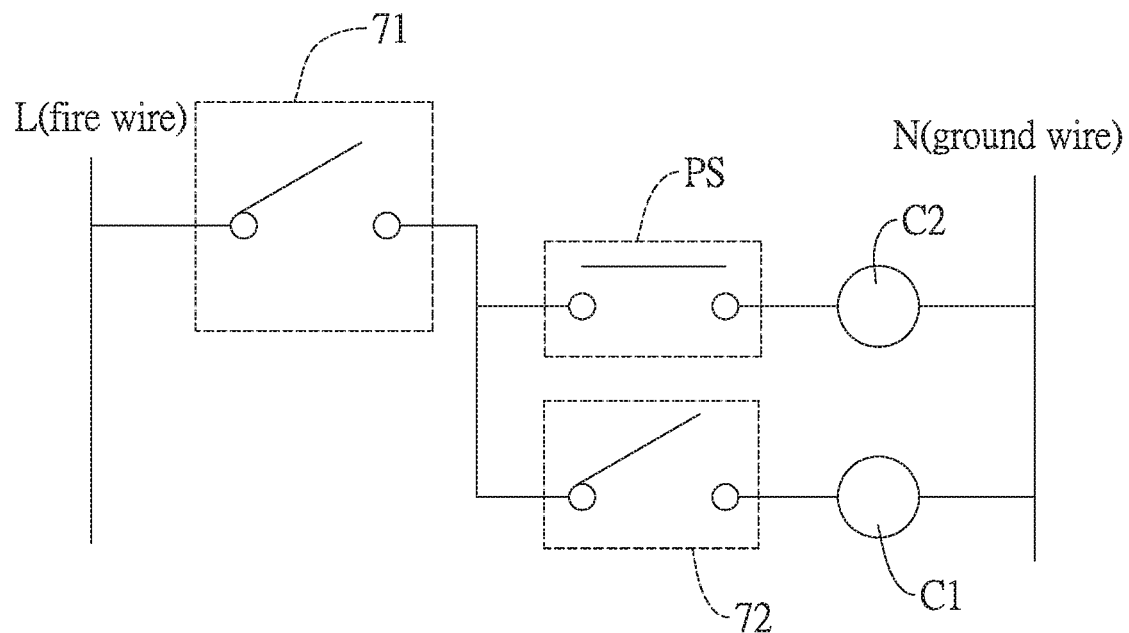
FIG. 3 is a schematic view of a control circuit of the first embodiment of the microbubble device controller of the present invention.

Referring to FIGS. 1-3, a microbubble device controller in accordance with the first embodiment of the present invention is provided for connecting with a pump P, and comprises: a box 10, a first water pipe 20, a gas pipe 30 and a bypass pipe 40.

The box 10 has an accommodation space 11.

The first water pipe 20 is disposed in the accommodation space 11, and has one end connected to the pump P for supplying water. The first water pipe 20 is provided with a first electromagnetic control valve C1 which has an opened state and a closed state, so that the first water pipe 20 is switched between a high flow rate state and a closed state (no water flowing) through the opened state and the closed state of the first electromagnetic control valve C1. Another end of the first water pipe 20 is connected to a spa tube 80.

The gas pipe 30 is disposed in the accommodation space 11, one end of the gas pipe 30 is connected to a gas supply source A, and another end of the gas pipe 30 is connected to the pump P. The gas pipe 30 is provided with a second electromagnetic control valve C2 for controlling the gas pipe 30 to be in an opened state or a closed state.

The bypass pipe 40 has one end connected to the first water pipe 20. In a specific embodiment, the bypass pipe 40 is connected between the pump P and the first electromagnetic control valve C1, and another end of the bypass pipe 40 is connected to a microbubble pressure reducing valve 90.

Since the microbubble pressure reducing valve 90 has a higher resistance than the spa tube 80, when the first electromagnetic control valve C1 is in the opened state, the water will flow toward the lower resistance spa tube 80, so that the first water pipe 20 is in a high flow state, and the bypass pipe 40 is in a low pressure (low flow rate) state. Otherwise, when the first electromagnetic control valve C1 is in the closed state, the water can only flow to the microbubble pressure reducing valve 90 which has a higher resistance, and at this time, the bypass pipe 40 is in a high pressure (high flow) state. The bypass pipe 40 is provided with a pressure switch PS for detecting whether the bypass pipe 40 is in a high pressure state or a low pressure state. The pressure switch PS is in telecommunication connection with the second electromagnetic control valve C2. When the bypass pipe 40 is in a high pressure state, the second electromagnetic control valve C2 opens the gas pipe 30. Otherwise, when the bypass pipe 40 is in a low pressure state, the second electromagnetic control valve C2 closes the gas pipe 30.

Preferably, the pressure switch PS is further connected to a pressure gauge PG which is provided to display the pressure value of the bypass pipe 40.

Preferably, the present invention is further provided with a gas release valve 50 which is in communication with the first water pipe 20 to remove the gas of the first water pipe 20 or the bypass pipe 40 to prevent the pump P from losing pressure.

Figure 4:
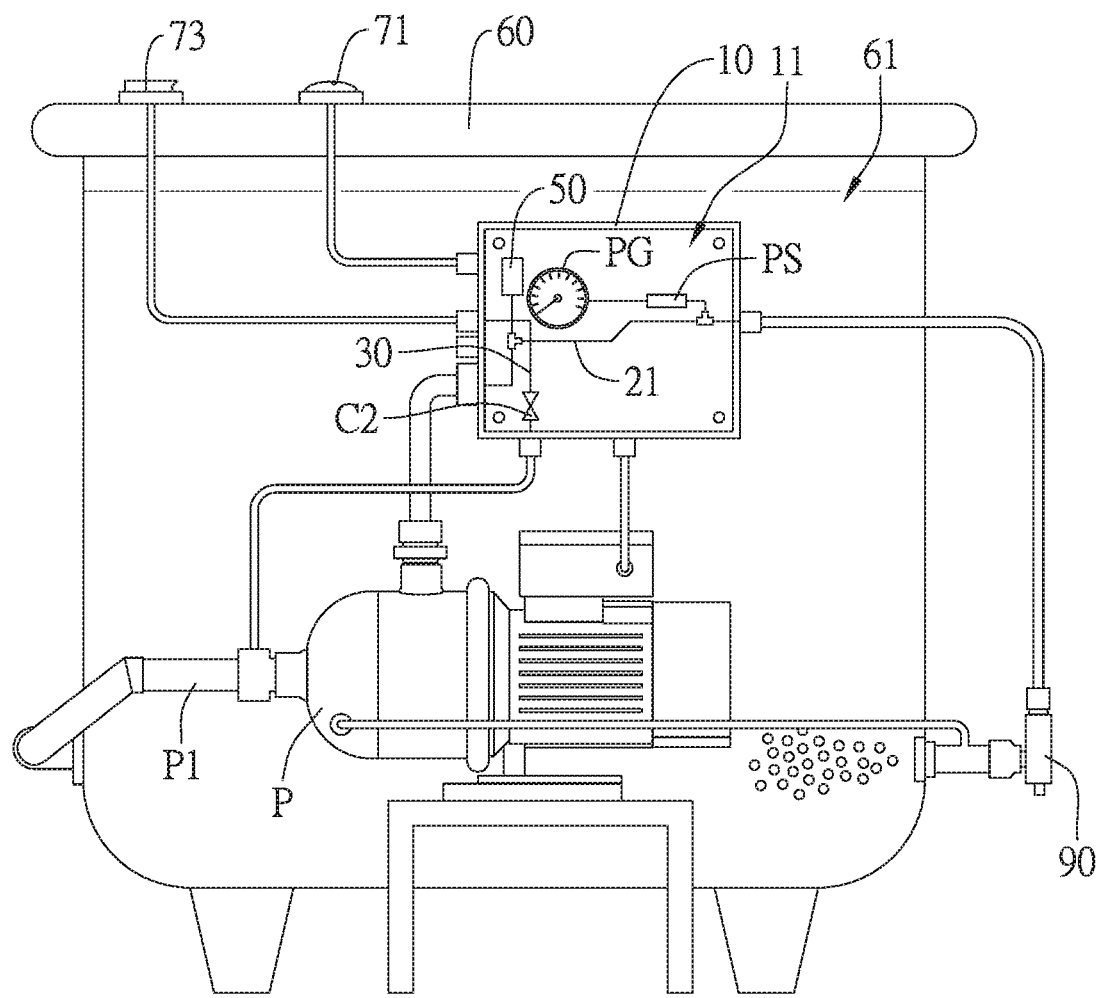
FIG. 4 is a schematic view of a second embodiment of a system equipped with a microbubble device controller of the present invention.
Figure 5:
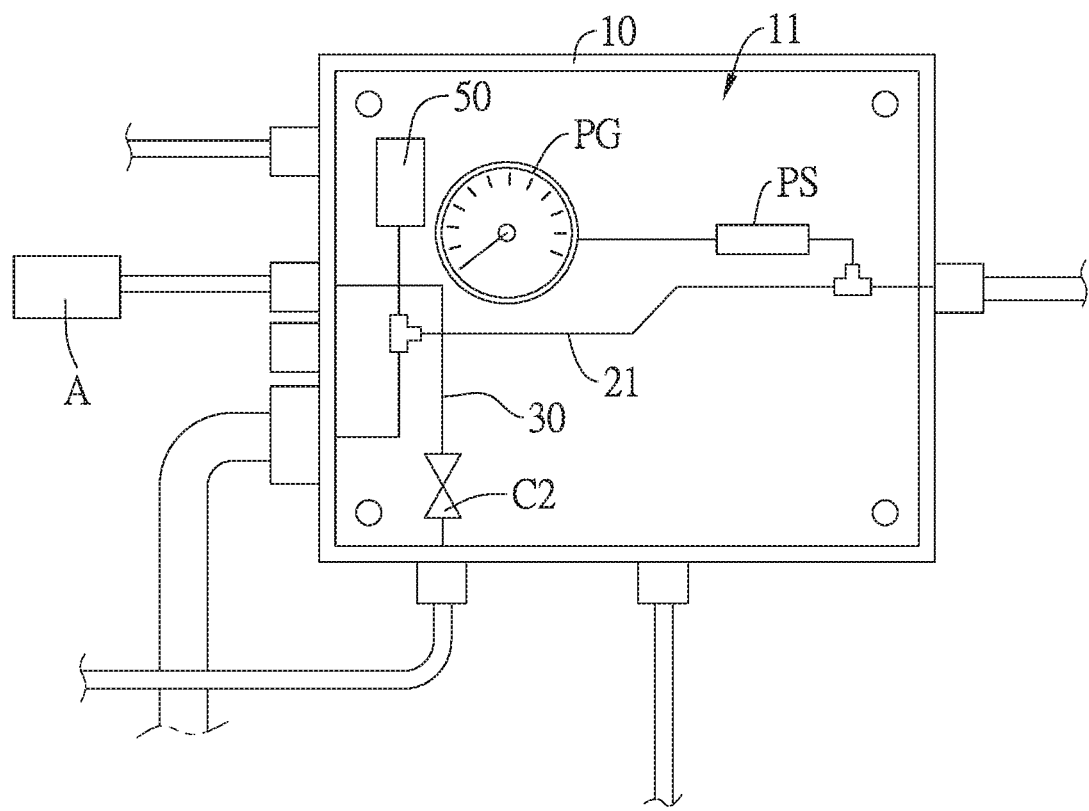
FIG. 5 is a schematic view showing the second embodiment of the microbubble device controller of the present invention.
Figure 6:
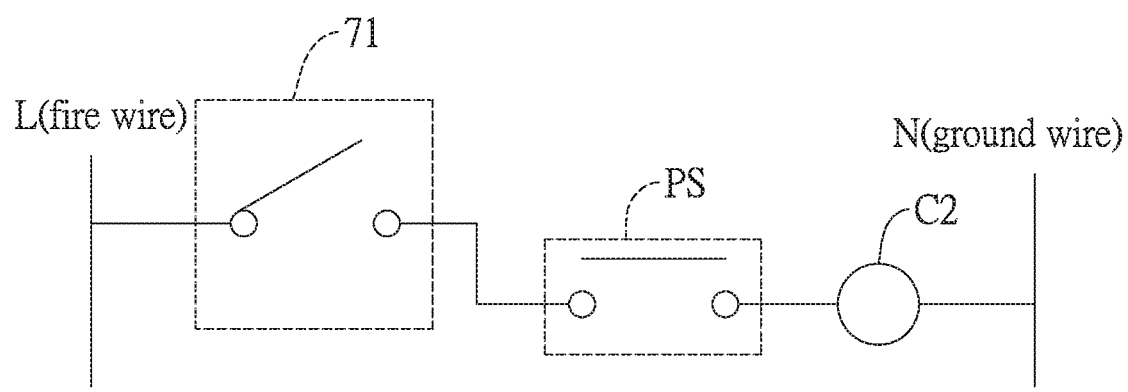
FIG. 6 is a schematic diagram of the control circuit of the second embodiment of the microbubble device controller of the present invention.

The second embodiment of the microbubble device controller of the present invention is as follows. Before the detailed description is made, it is noted that in the following description, similar elements are denoted by the same reference numerals, as shown in FIGS. 4-6, the second embodiment of the microbubble device controller of the present invention comprises: a box 10, a second water pipe 21 and a gas pipe 30.

The box 10 has an accommodation space 11.

The second water pipe 21 is disposed in the accommodation space 11, and has one end connected to a pump P and another connected to a microbubble pressure reducing valve 90. The second water pipe 21 has a high pressure state and a closed state, and is provided with a pressure switch PS for detecting whether the second water pipe 21 is in the high pressure state or the closed state.

The gas pipe 30 is disposed in the accommodation space 11, one end of the gas pipe 30 is connected to a gas supply source A, and another end of the gas pipe 30 is connected to the pump P. The gas pipe 30 is provided with a second electromagnetic control valve C2 for controlling the gas pipe 30 to be in an opened state or a closed state. The pressure switch PS is in telecommunication connection with the second electromagnetic control valve C2. When the second water pipe 21 is in a high pressure state, the second electromagnetic control valve C2 opens the gas pipe 30, and when the second water pipe 21 is in the closed state, the second electromagnetic control valve C2 closes the gas pipe 30.

Preferably, the pressure switch PS is further connected to a pressure gauge PG which is used display the pressure value of the second water pipe 21.

Preferably, the present invention is further provided with a gas release valve 50 which is in communication with the second water pipe 21 to remove the gas of the second water pipe 21 to prevent the pump P from losing pressure.

A system with the microbubble device controller in accordance with a first embodiment of the present invention is described as follows. Before the detailed description is made, it is to be noted that the aforementioned system with the microbubble device controller includes the technical features of the first embodiment of the microbubble device controller, and therefore, in the following description, it will not be described in detail, and only the components other than the microbubble device controller will be described. As shown in FIGS. 1-3, the system with the microbubble device controller in accordance with the first embodiment of the present invention comprises: a tank 60, a pump P, a start switch 71, a function switch 72, a spa tube 80, and a microbubble pressure reducing valve 90.

The tank 60 has a water-receiving space 61. In this embodiment, the tank 60 is a bathtub.

The pump P is connected to a return pipe P1, the first water pipe 20 and the gas pipe 30. The return pipe P1 is connected to the water-receiving space 61.

The start switch 71 is in telecommunication connection with the pump P to turn on or turn off the pump P.

The function switch 72 is in telecommunication connection with the first electromagnetic control valve C1 to control the first electromagnetic control valve C1, thereby controlling the first water pipe 20 to be in a high flow rate or a closed state.

The spa tube 80 is in communication with the first water pipe 20 to provide a spa function.

The microbubble pressure reducing valve 90 is connected to the bypass pipe 40 to provide a microbubble function.

Preferably, the system of this embodiment is further provided with an air regulating valve 73 connected to the air supply source A to adjust the intake air amount of the air supply source A.

A system with the microbubble device controller in accordance with a second embodiment of the present invention is described as follows. Before the detailed description is made, it is to be noted that the aforementioned system with the microbubble device controller includes the technical features of the second embodiment of the microbubble device controller, and therefore, in the following description, it will not be described in detail, and only the components other than the microbubble device controller will be described. As shown in FIGS. 4-6, the system with the microbubble device controller in accordance with the second embodiment of the present invention comprises: a tank 60, a pump P, a start switch 71 and a microbubble pressure reducing valve 90.

The tank 60 has a water-receiving space 61. In this embodiment, the tank 60 is a bathtub.

The pump P is connected to a return pipe P1, the second water pipe 21 and the gas pipe 30. The return pipe P1 is connected to the water-receiving space 61.

The start switch 71 is in telecommunication connection with the pump P to turn on or turn off the pump P.

The microbubble pressure reducing valve 90 is connected to the second water pipe 21 to provide a microbubble function.

Preferably, the system of this embodiment is further provided with an air regulating valve 73 connected to the air supply source A to adjust the intake air amount of the air supply source A.

While we have shown and described various embodiments in accordance with the present invention, it is clear to those skilled in the art that further embodiments may be made without departing from the scope of the present invention.

What is claimed is:

1. A microbubble device controller provided for connecting to a pump, comprising:
   a box having an accommodation space;
   a first water pipe disposed in the accommodation space, and having one end connected to the pump, wherein the first water pipe is provided with a first electromagnetic control valve to control the first water pipe to be in a high flow rate state or a closed state;
   a gas pipe disposed in the accommodation space and having one end connected to a gas supply source and another end connected to the pump, wherein the gas pipe is provided with a second electromagnetic control valve for controlling the gas pipe to be in an opened state or a closed state;
   a bypass pipe having one end connected to the first water pipe and another end connected to a microbubble pressure reducing valve; wherein the bypass pipe has a high pressure state and a low pressure state, when the first water pipe is in the high flow rate state, the bypass pipe is in the low pressure state, when the first water pipe is in the closed state, the bypass pipe is in the high pressure state, the bypass pipe is provided with a pressure switch for detecting whether the bypass pipe is in the high pressure state or the low pressure state, the pressure switch is in telecommunication connection with the second electromagnetic control valve, when the bypass pipe is in a high pressure state, the second electromagnetic control valve opens the gas pipe, when the bypass pipe is in a low pressure state, the second electromagnetic control valve closes the gas pipe.

2. The microbubble device controller as claimed in claim 1, wherein the pressure switch is connected to a pressure gauge.

3. The microbubble device controller as claimed in claim 1 further comprising a gas release valve which is in communication with the first water pipe.

4. A system with the microbubble device controller as claimed in claim 1, and further comprising:
   a tank having a water-receiving space;
   the pump being connected to a return pipe, the first water pipe and the gas pipe, wherein the return pipe is connected to the water-receiving space;
   a start switch in telecommunication connection with the pump to turn on or turn off the pump;
   a function switch in telecommunication connection with the first electromagnetic control valve to control the first water pipe to be in a high flow rate or a closed state;
   a spa tube in communication with the first water pipe to provide a spa function; and
   a microbubble pressure reducing valve connected to the bypass pipe to provide a microbubble function.

5. The system with the microbubble device controller as claimed in claim 4 further comprising an air regulating valve connected to the air supply source to adjust an intake air amount of the air supply source.

6. The system with the microbubble device controller as claimed in claim 4, wherein the pressure switch is further connected to a pressure gauge.

7. A microbubble device controller provided for connecting to a pump, comprising:
   a box having an accommodation space;
   a second water pipe disposed in the accommodation space, and having one end connected to the pump and another connected to a microbubble pressure reducing valve, wherein the second water pipe has a high pressure state and a closed state, and is provided with a pressure switch for detecting whether the second water pipe is in the high pressure state or the closed state;
   a gas pipe disposed in the accommodation space, and having one end connected to a gas supply source and another end connected to the pump, wherein the gas pipe is provided with a second electromagnetic control valve for controlling the gas pipe to be in an opened state or a closed state, the pressure switch is in telecommunication connection with the second electromagnetic control valve, when the second water pipe is in the high pressure state, the second electromagnetic control valve opens the gas pipe, and when the second water pipe is in the closed state, the second electromagnetic control valve closes the gas pipe.

8. The microbubble device controller as claimed in claim 7, wherein the pressure switch is connected to a pressure gauge.

9. The microbubble device controller as claimed in claim 7 further comprising a gas release valve which is in communication with the second water pipe.

10. A system with the microbubble device controller as claimed in claim 7, and further comprising:
 a tank has a water-receiving space;
 the pump being connected to a return pipe, the second water pipe and the gas pipe, wherein the return pipe is connected to the water-receiving space;
 a start switch in telecommunication connection with the pump to turn on or turn off the pump; and
 a microbubble pressure reducing valve connected to the second water pipe to provide a microbubble function.

11. The system with the microbubble device controller as claimed in claim 10 further comprising an air regulating valve connected to the air supply source to adjust an intake air amount of the air supply source.

12. The system with the microbubble device controller as claimed in claim 10, wherein the pressure switch is further connected to a pressure gauge.

* * * * *